(12) United States Patent
Inoue et al.

(10) Patent No.: US 6,380,536 B1
(45) Date of Patent: Apr. 30, 2002

(54) ROTATION ANGLE DETECTOR FOR DETECTING A ROTATIONAL POSITION OF A STEERING WHEEL OF A VEHICLE

(75) Inventors: Makoto Inoue, Osaka; Susumu Nishimoto, Nara; Norimitsu Kurihara, Saitama; Masahide Ohnishi; Katsuya Saitou, both of Fukui, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/423,999
(22) PCT Filed: Mar. 16, 1999
(86) PCT No.: PCT/JP99/01281
§ 371 Date: Jan. 31, 2000
§ 102(e) Date: Jan. 31, 2000
(87) PCT Pub. No.: WO99/47887
PCT Pub. Date: Sep. 23, 1999

(30) Foreign Application Priority Data

Mar. 17, 1998 (JP) .......................................... 10-066610

(51) Int. Cl.⁷ .................................................. G01D 5/34
(52) U.S. Cl. ............................ 250/231.13; 250/231.17; 701/41
(58) Field of Search ...................... 250/231.13, 231.14, 250/231.16, 231.17, 231.18, 214 R, 233; 356/616; 701/41; 341/6, 13

(56) References Cited

U.S. PATENT DOCUMENTS 5,243,188 A * 9/1993 Hattori et al. ......... 250/231.16

FOREIGN PATENT DOCUMENTS

| JP | 63-195943 | 12/1988 |
| JP | 3-120419 | 5/1991 |
| JP | 5-187889 | 7/1993 |
| JP | 6-234366 | 8/1994 |

OTHER PUBLICATIONS

Japanese language search report for Inl'l Appln. No. PCT/JP99/01281 dated Jun. 15, 1999.

English translation of Japanese language search report.

* cited by examiner

Primary Examiner—Kevin Pyo
(74) Attorney, Agent, or Firm—Ratner & Prestia

(57) ABSTRACT

The present invention aims at providing a rotation angle detector capable of detecting and storing information for a direction and an angle of rotation of steering wheel while maintaining a condition of reduced power consumption from a battery, when an engine is not running. In achieving the object, the invention discloses a structure, wherein the detector keeps a control means (8) including a memory unit (11) in a memory back-up mode when an ignition switch (7*a*), i.e. a main switch, is turned off, switches a power supply for sensor elements (3*a*), (3*b*) and (4) into a mode of low consumption of current, which is smaller than that of the normal current by a control signal of the control means (8), and allows the control means (8) to activate the sensor elements (3*a*), (3*b*) and (4) operative in the normal mode after a confirmation of an output signal from at least one of the sensor elements (3*a*) and (3*b*) when the steering wheel is moved, and thereby the detector is capable of detecting the direction and the angle of rotation out of the information for rotation of the steering wheel.

3 Claims, 5 Drawing Sheets

ROTATION ANGLE DETECTOR FOR DETECTING A ROTATIONAL POSITION OF A STEERING WHEEL OF A VEHICLE

This application is a U.S. National Phase Application of PCT international application PCT/JP99/01281.

FIELD OF THE INVENTION

The present invention relates to a rotation angle detector for detecting a rotational position of a steering wheel of a vehicle.

BACKGROUND OF THE INVENTION

In general, steering for vehicles such as an automobile is provided with a lock-to-lock latitude for a steering wheel between a rightmost and a leftmost positions, when a steering wheel is turned clockwise and counterclockwise for several times (normally, 3 to 6 revolutions).

A reason of the above is to reduce a physical force required for an operator to turn the steering wheel by decreasing a speed of rotary movement of the steering wheel with a steering gear. Another reason is to reduce vibrations and impacts of wheels from being transmitted to the steering wheel. It is also for a reason to improve maneuverability by increasing an amount of turning the steering wheel (i.e. steering angle) necessary for changing a heading direction of the vehicle. In other words, the vehicle would require the operator to pay an excessive degree of attentiveness, if a small turning of the steering wheel should cause a substantial change in the moving direction. Stable traveling of the vehicle is thus achieved by providing a handling characteristic broad enough and suitable for a general sense of operators.

For the same reason, the operator is unable to determine a rotational position of the steering wheel at a glance, nor is she/he able to find a moving direction of the vehicle. A rotation angle detector for detecting a position and an angle of rotation of the steering wheel has hence been suggested. That is, an operator can easily determine a moving direction of her/his vehicle (especially, whether or not it heads straight) by using the detector. The detector is also adaptable for a variety of control devices such as (1) a device that changes firmness of a suspension according to an angle of a steering wheel, (2) a device for alarming an operator in case a steering wheel is turned beyond a predetermined angle, and (3) a device for guiding the operator for a way to return home.

FIG. 5 shows a structure of a rotation angle detector of the prior art. In the figure, a reference numeral 1 represents a disc having a first series of through holes 1a provided thereon with a predetermined pitch, and it is fixed to a rotor 2. Reference numerals 3a and 3b respectively represent a first and a second sensor elements, each comprising a transmission type photo-interrupter consisting of a light-emitting element and a light-receiving element positioned in a manner to face each other across the first series of through holes 1a. The two sensor elements are provided side by side in order to detect a direction of rotation. The first sensor element 3a and the second sensor element 3b are prearranged to form a predetermined angle between them. The disc 1 also has a cutout hole 1b, and a third sensor element 4 comprising another transmission type photo-interrupter is provided for detecting the cutout hole 1b, so that the detector detects a reference position for rotation of the rotor 2 by the third sensor element 4 with the cutout hole 1b.

The rotor 2, the sensor elements 3a and 3b, and the sensor element 4 are all housed in a case 5. The rotor 2 is so arranged that it rotates freely in synchronization with a rotation of the steering wheel in a vehicle or the like.

A mutual relation and operation of the foregoing structural elements of the prior art detector will be described hereinafter. When the steering wheel is made in a vehicle, it rotates the rotor 2 in a link motion, as well as the disc 1 fixed to the rotor 2, and the sensor elements 3a and 3b detect a number of the through holes 1a in the disc 1. The detector is able to measure an angle of the rotation of the steering wheel and to detect a direction of the rotation, using the number of the through holes 1a detected by the first and second sensor elements 3a and 3b as a coefficient, since the through holes 1a are arranged with a predetermined angle pitch, and the first and second sensor elements 3a and 3b are disposed with a difference of 90 degrees in electrical phase between them.

On the other hand, the sensor element 4 can produce a reference position signal, when the cutout hole 1b passes through it as the rotor 2 and the disc 1 rotate. Thus, the detector is able to determine a present angle of the rotation of the steering wheel by calculating an amount of change in angle of rotation of the steering wheel obtained as above, with reference to a position where the reference position signal is obtained by the sensor element 4 from the cutout hole 1b.

Accordingly, the angle and direction of the rotation of the steering wheel can be calculated by processing the number and phase of detected signals for the angle and direction of the rotation with an electronic circuit. Subsequently, a rotational position of the steering wheel can be determined from the angle and direction of the rotation of the steering wheel.

When an engine of the vehicle is not running (an ignition key is in an "OFF" or an "Accessory" position), electric power is not supplied to the rotation angle detector. The detector is unable to determine an angle of the rotation of the steering wheel until the cutout hole 1b passes through the sensor element 4 after the engine is started. Also, the detector is unable to determine how many revolutions the steering wheel has been turned at any point of time from only passage of the through holes 1a by the sensor elements 3a and 3b, since the steering wheel is made to turn complicatedly. In general, therefore, the detector is designed to determine a neutral position of the steering wheel by making a comparison of the passage data of the through holes 1a with information of number of rotations between right and left wheels, etc. In other words, the detector is unable to make a conclusive determination of an angle of rotation of the steering wheel until the vehicle makes a straight travel after the engine is started.

In order to solve the above problem, a method has been employed in some of the devices in that an electronic circuit is equipped with a memory element, which functions even when the engine is in a state of standstill, for storing information of a rotational position of the steering wheel immediately before the engine is turned off.

However, an inconsistency occurs between an actual angle of rotation and the stored angle of rotation of the steering wheel, if the steering wheel is turned while the engine is not running. This causes the detector to execute a control based on an incorrect angle of rotation of the steering wheel, and thereby giving rise to a problem that the detector is not able to carry out the intended control.

SUMMARY OF THE INVENTION

The present invention aims at solving the above-described problems, and to provide a rotation angle detector, which operate in a manner to: (1) back up memory of an angle and a direction of the rotation of a steering wheel in a memory element of an electronic circuit; (2) activate the detector by itself with own sensor element on a standby mode, when the steering wheel is turned while an engine is at a standstill; and (3) detect an angle and a direction of the rotation of the steering wheel, even when the engine is not running.

In order to solve the above problems, a rotation angle detector of the present invention comprises: (1) a disc having a plurality of through holes arranged with a predetermined pitch along a perimeteric direction, and a cutout portion provided in a predetermined position along the perimeteric direction; (2) a first and a second sensor elements, each comprising a light-emitting element and a light-receiving element, and disposed within a predetermined angle in a manner to correspond with the through holes in the disc; (3) a third sensor element comprising a light-emitting element and a light-receiving element, and disposed in a manner to correspond with the cutout portion in the disc; and (4) a control means comprising a signal processing unit for generating an output of detection signal corresponding to an angle and a direction of rotation of the disc using signals provided by the first, second and third sensor elements, and a memory unit for storing, as a positional information, the output provided by the signal processing unit, when a main switch is turned on. The control means includes: (a) a first means for introducing a dark current mode for maintaining the sensor elements operative with a lower supply current than that consumed under a normal operating condition, even when the main switch is in an OFF position; (b) a second means for introducing a memory backup mode for maintaining a storing condition of the positional information supplied from the signal processing unit by providing a current supply to the memory unit, even when the main switch is in the OFF position; (c) a third means for canceling the memory backup mode and the dark current mode so as to turn the sensor elements and the control means into their normal operating conditions, when the sensor elements operated under the dark current mode of the first means detect a motion of the disc; and (d) a fourth means for actuating the first means and the second means into operation so as to resume the memory backup mode and the dark current mode, if the sensor elements no longer detect motion of the disc while in a condition after the third means has canceled these modes.

With the foregoing structure, the detector is capable of obtaining information of an absolute steering angle immediately after the engine is started, since the detector keeps in memory a steering wheel position, monitors any movement of the steering wheel at all times, and renews the stored information if any change takes place while the engine is not running.

BRIEF DESCRIPTION OF THE PREFERRED EMBODIMENTS

FIG. 1(*b*) is a sectional view of the same rotation angle detector;

DESCRIPTION OF THE PREFERRED EMBODIMENTS

Embodiment 1

Figure 1A:
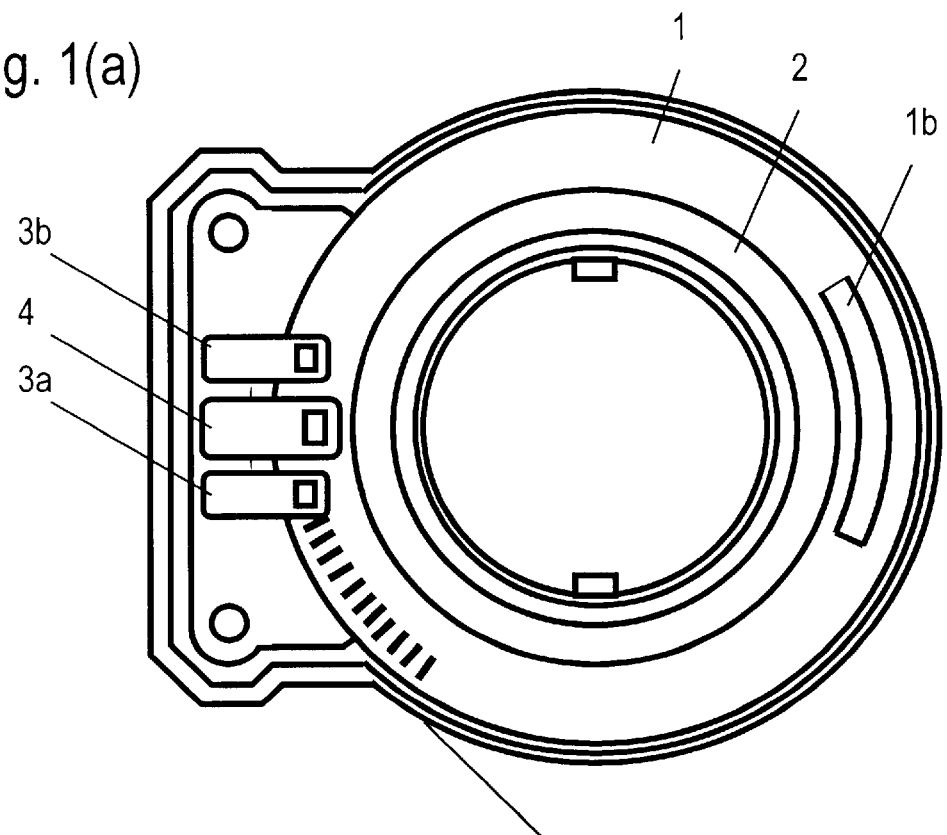
FIG. 1(*a*) is a plan view depicting a rotation angle detector of embodiment 1 of the present invention.
Figure 1B:
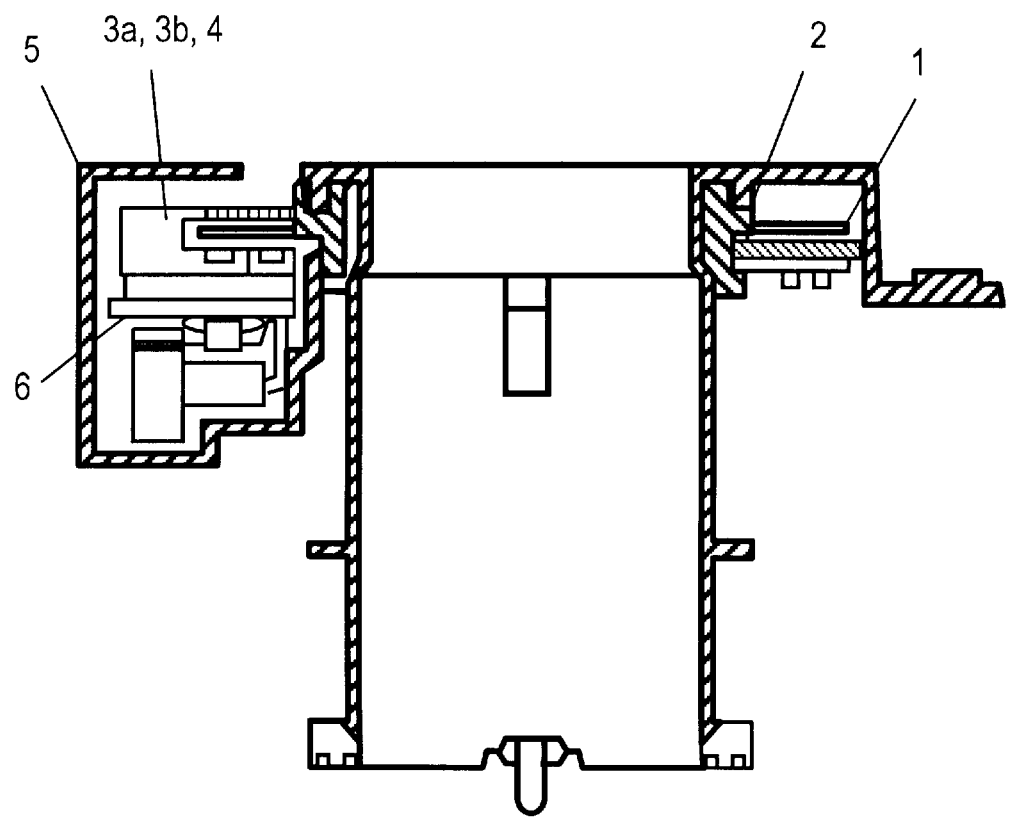
Figure 2:
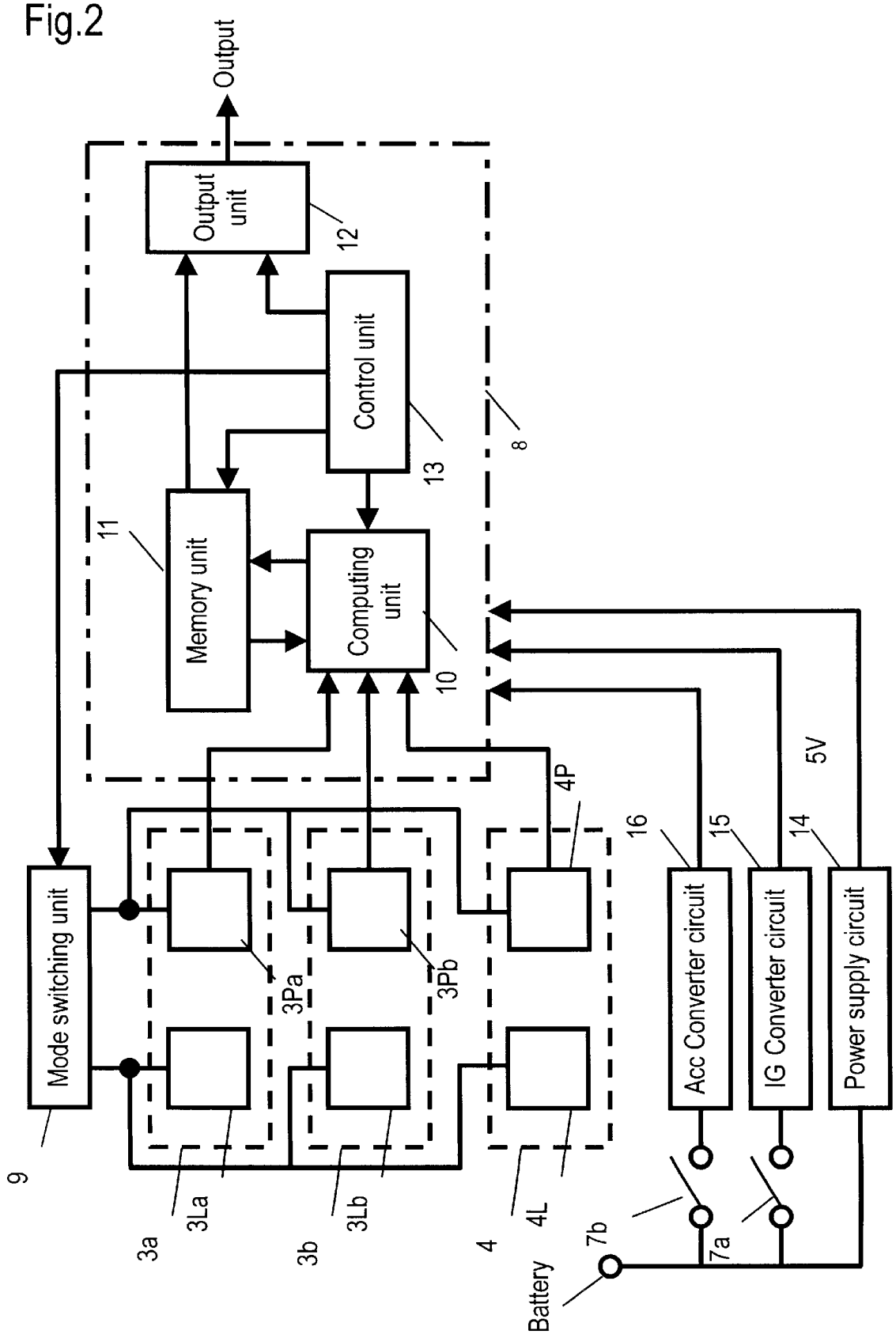
FIG. 2 is an electrical block diagram of the same rotation angle detector.
Figure 5:
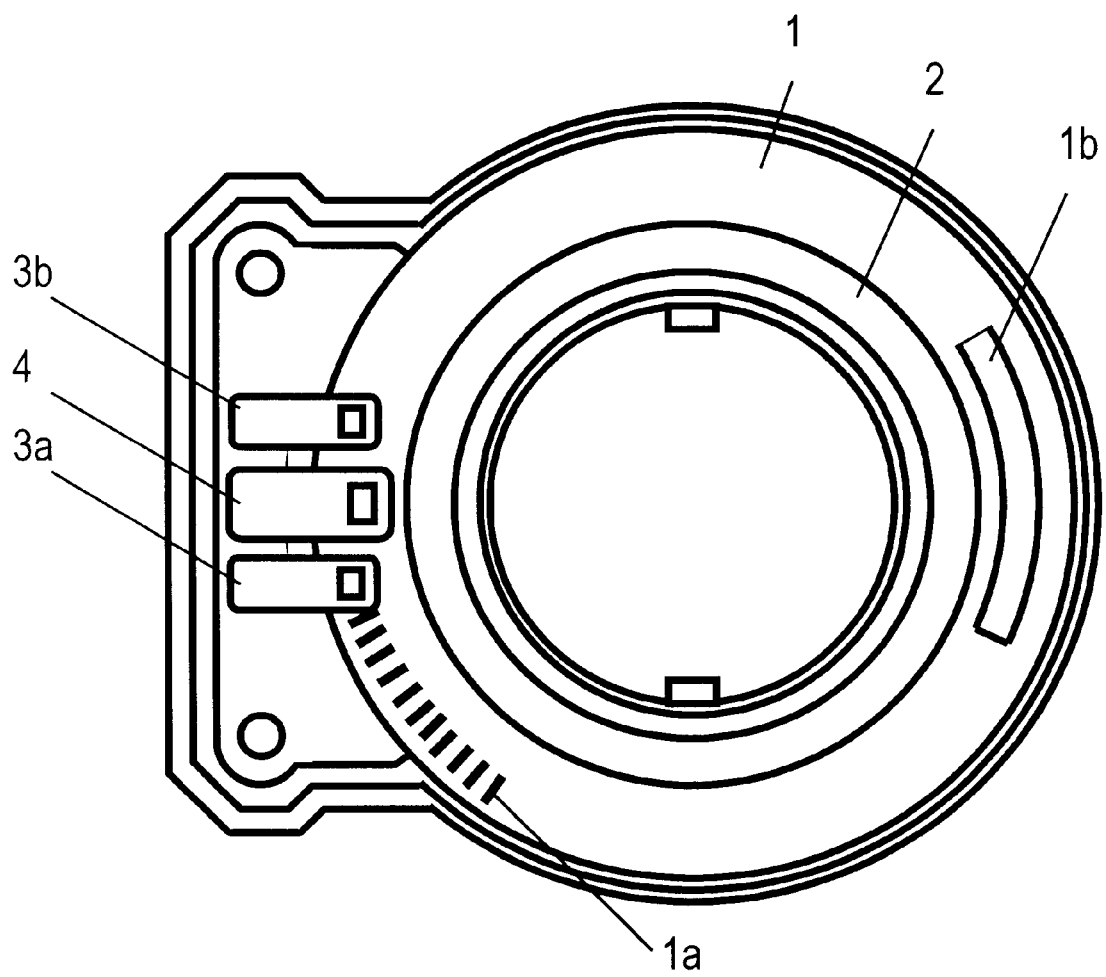
FIG. 5 is a plan view depicting a rotation angle detector of the prior art.

FIGS. 1(*a*) and 1(*b*) depict a rotation angle detector of embodiment 1 of the present invention, wherein FIG. 1(*a*) is a plan view, and FIG. 1(*b*) is a sectional view. Any component represented by the same reference numeral as that of FIG. 5 is an element having identical structure, and detailed description of it will be omitted. In FIGS. 1(*a*) and 1(*b*), a reference numeral 6 represents an electronic circuit including a microcomputer (hereinafter referred to as "computer") provided within the rotation angle detector. FIG. 2 is an electrical block diagram of the same rotation angle detector, and it includes an ignition switch 7*a* and an accessory switch 7*b*, both of which constitute a main switch. Electric power is supplied to the rotation angle detector directly from a battery, even if these switches 7*a* and 7*b* are turned off. A reference numeral 8 represents a control means, which executes a switching control for an operating mode of the computer and sensor elements 3*a*, 3*b* and 4, between a normal mode and a current saving mode. A reference numeral 9 represents a mode switching unit for switching the sensor elements between the normal mode and the power saving mode, and it controls a power supply to light-emitting/light-receiving elements. The control means 8 includes a computing unit 10 and a memory unit 11 for storing an absolute angular position, and that the memory unit 11 retains an absolute angular position of the disc 1 using power supplied directly from the battery, even when the ignition switch 7*a* and the accessory switch 7*b* remain turned off (in their OFF positions). The computing unit 10 calculates an amount of change in angle according to signals obtained from the sensor elements 3*a*, 3*b* and 4, obtains a new absolute angle using the information of absolute steering angle stored in the memory unit 11, and renews the information in the memory unit 11. On the other hand, an output unit 12 outputs the angle information stored in the memory unit 11 as an electric signal, and a control unit 13 executes an overall control of the computer. A reference numeral 14 represents a power supply circuit for converting a 12-volt supply from the battery into a 5-volt supply, and a reference numeral 15 represents a converter circuit for converting a 12-volt signal of the ignition switch 7*a* into an input signal for the computer. A reference numeral 16 represents another converter circuit for converting a 12-volt signal of the accessory switch 7*b* into another input signal for the computer. In the figure, the sensor elements 3*a*, 3*b* and 4 include their respective light-emitting elements 3La, 3Lb and 4L, and light-receiving elements 3Pa, 3Pb and 4P.

Figure 3:
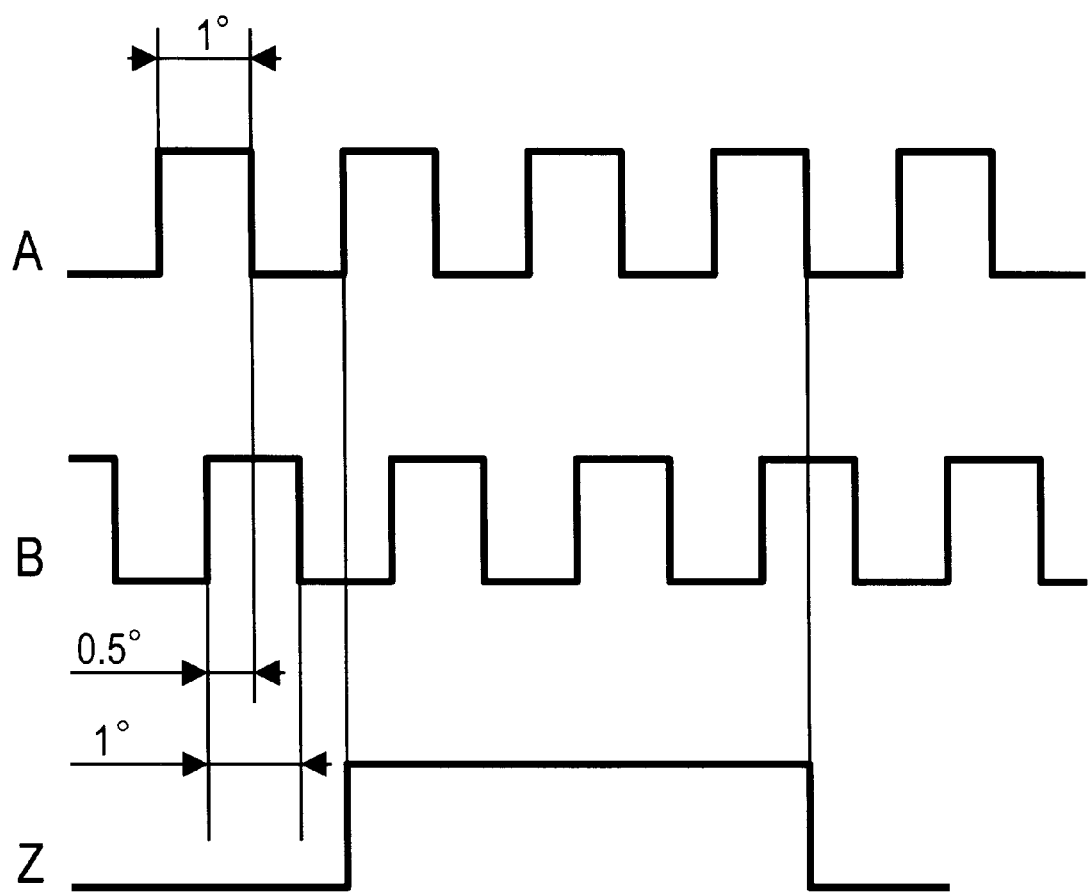
FIG. 3 is a timing chart depicting outputs of sensor elements produced in conjunction with a change in angle of rotation in the same rotation angle detector.

FIG. 3 depicts timing at which the sensor elements produce outputs in conjunction with a change in angle of rotation, and reference characters A, B and Z respectively represent outputs of the sensor elements 3*a*, 3*b* and 4. The sensor elements 3*a* and 3*b* change signal levels of their outputs A and B alternately between H and L at intervals of 1 degree in the rotational angle of the disc 1, and they are so positioned that the changes in signal level shift by 0.5 degree from each other. The sensor elements 3*a*, 3*b* and 4 are positioned with respect to each other so that the change in signal level of the output Z coincides with that of the signal A.

The rotation angle detector constructed as above operates in a manner which will be described hereinafter with reference to FIG. 4.

Figure 4:
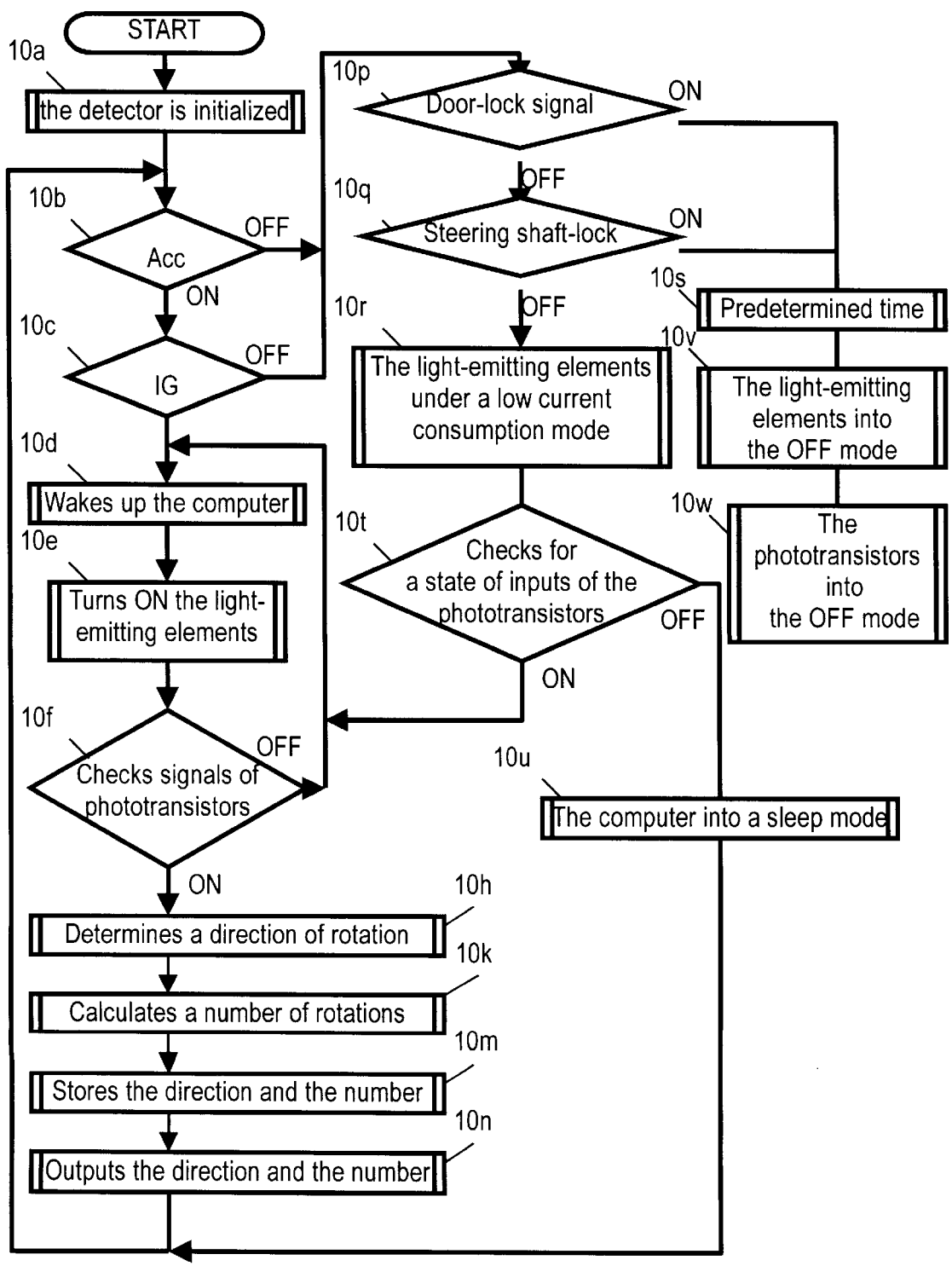
FIG. 4 is an operational flow chart depicting a construct of an essential portion of the same rotation angle detector.

FIG. 4 depicts an operational flow covering an essential portion of the same rotation angle detector. In the step 10*a*, the detector is initialized (e.g. setting up an I/O port of the computer, setting up a variety of registers, and setting up a RAM), when electric power is supplied for the first time from the battery, or the computer is reset. The detector checks a position of the accessory switch and a position of the ignition switch in the main switch in the steps 10b and 10c. When the ignition switch is turned on, that is, the engine is started or rotated, the detector wakes up the computer into operation (functional mode) in the step 10d, and operates the sensor elements under the normal mode in the step 10e. If the sensor elements are in their OFF state upon checking signals of photo-transistors in the sensor elements in the step 10f, the detector resumes the step 10d for wake-up operation of the computer. If the sensor elements are in their ON state upon checking signals of the photo-transistors in the sensor elements in the step 10f, the detector determines a direction of rotation in the step 10h, calculates a number of rotations in the step 10k, stores the direction and the number of rotations resulted from the calculation according to the direction of rotation determined in the step 10h into the memory unit in the step 10m, and outputs them externally in the step 10n. The detector then resumes again the step 10b for checking a position of the accessory switch.

The memory unit having a storage function dictated in the step 10m may be replaced by any one of;

(a) a RAM unit in the computer, or in case the battery run down, (b) an electrically erasable programmable ROM (hereinafter referred to as "EEPROM") provided external of the computer, and (c) a RAM provided external of the computer, and connected with a battery (e.g. lithium-ion battery) or a capacitor of large capacity as a supplementary power supply for the external RAM.

The routine of operation described above shows that the detector functions under the normal mode of power consumption for detecting an angle and a direction of the rotation of a steering wheel during the engine running. In this instance, the computer consumes an electric current of approximately 5 mA under the normal mode for its wake-up in the step 10d. A light-emitting element for each of the sensor elements consumes approximately 6 mA in the step 10e, for a total current of nearly 12 mA between two of them. Therefore, the detector consumes a current of approximately 17 to 18 mA in all for the wake-up operation of the computer in the step 10d and for functioning the light-emitting elements of the sensor elements in the step 10e.

On the other hand, the detector controls its operation under a different routine than what is described in the above, if the accessory switch and the ignition switch within the main switch are both in their OFF positions in the steps 10b and 10c. In this routine, the steps 10b and 10c fulfil a determining function for selecting a mode that does not consume power of the battery during the engine not running, and these steps can be substituted by other signals if available.

When both switches are in their OFF positions in the steps 10b and 10c, the detector turns on the light-emitting elements of the sensor elements under a low current consumption mode in the step 10r, if a door-lock signal as well as a steering shaft-lock signal are OFF in the respective steps 10p and 10q. The detector increases a gain of the phototransistors of the sensor elements in order for them to be operative even with the light-emitting elements of the sensor elements in the low current consumption mode, and checks for a state of inputs in the step 10t. The detector then resumes again the step 10b for a check of position of the accessory switch, after turning the computer into a sleep mode (i.e. for backing up memory) in the step 10u, if the inputs are in the OFF state. However, if power of the inputs are ON in the step 10t as a result of checking the state of inputs under the condition of increased gain of the phototransistors of the sensor elements, the detector takes the step 10d for executing the detecting operation of a direction and an angle of rotation by the sensor elements under the normal operating mode.

Further, when both switches are judged to be in their OFF positions in the steps 10b and 10c, and if the door-lock signal and the steering shaft-lock signal are ON in the respective steps 10p and 10q, the detector turns the light-emitting elements of the sensor elements into the OFF mode in the step 10v after lapse of a predetermined time determined by the step 10s. The detector then turns the phototransistors of the sensor elements into the OFF mode in the step 10w, and the computer into the sleep mode in the step 10u. The computer keeps its condition of backing up memory during the sleep mode in the step 10u.

In the above-described routine of operation, where the engine is at a standstill state, the detector consumes only about 0.01 to 0.1 mA during a part of the routine designated as a second dark current mode, in which the door-lock signal and the steering shaft-lock signal are ON and the computer is in the sleep mode, whereas it consumes approx. 0.6 mA during the other part of the routine designated as a first dark current mode, in which the door-lock signal and the steering shaft-lock signal are OFF. In these routines, the door-lock signal and the steering shaft-lock signal are signals implying that the steering wheel is not moved while the engine is not running. It needs no mentioning that the same function can be attained using a signal signifying a seated/unseated condition of a driver's sheet or a sheet next to it (i.e. a signal implying that no person is present within a space wherein the steering wheel can be moved), as an example of other signals.

When an engine of an automobile is standstill and a door-lock signal in its ON state, a battery normally supplies its electric power only to a limited devices such as a clock and a key-less entry receiver. The key-less entry receiver consumes a current of approximately 5 mA among these devices. On the contrary, the rotation angle detector consumes a mere current of approx. 0.6 mA during the above-stated first dark current mode and approx. 0.1 mA during the second dark current mode, which are not significant for a concern of the buttery running down while the engine is not running.

Although the described exemplary embodiment is a detector which employs transmission type photo-interrupters as the sensor elements 3a, 3b and 4, they may be substituted by reflection type photo-interrupters. If this is the case, the detector is to be provided with a disc 1 having light-reflecting portions in place of the through holes 1a and a cutout portion 1b.

Industrial Applicability

As has been described, the present invention is able to realize a rotation angle detector which is characterized by comprising: (1) a disc having a plurality of through holes arranged with a predetermined pitch along a perimeteric direction of it, and a cutout portion provided in a predetermined position along the perimeteric direction; (2) a first and a second sensor elements, each comprising a light-emitting element and a light-receiving element, and disposed within a predetermined angle in a manner to correspond with the through holes in the disc; (3) a third sensor element comprising a light-emitting element and a light-receiving element, and disposed in a manner to correspond with the cutout portion in the disc; and (4) a control means comprising a signal processing unit for generating an output of detection signal corresponding to an angle and a direction of rotation of the disc using signals provided by the first, second and third sensor elements, and a memory unit for storing, as a positional information, the output provided by the signal processing unit when a main switch is turned on. The control means includes: (a) a first means for introducing a dark current mode for maintaining the sensor elements operative with a lower supply current than that consumed under a normal operating condition, even when the main switch is in an OFF position; (b) a second means for introducing a memory backup mode for maintaining a storing condition of the positional information supplied from the signal processing unit by providing a current supply to the memory unit, even when the main switch is in the OFF position; (c) a third means for canceling the memory backup mode and the dark current mode so as to turn the sensor elements and the control means into their normal operating conditions, when the sensor elements operated under the dark current mode of the first means detect a motion of the disc; and (d) a fourth means for activating the first and the second means into operation so as to resume the memory backup mode and the dark current mode, if the sensor elements no longer detect motion of the disc while in a condition after the third means has canceled these modes. With the simple structure as described above, the rotation angle detector is able to detect an angle and a direction of the rotation of the steering wheel even when the engine is not running, since the detector stores information of the rotation of the steering wheel by activating the control means using signals from the photo-transistors of the sensor elements, if the steering wheel is turned while the engine is not running.

What is claimed is:

1. A rotation angle detector comprises:
   (1) a disc having a plurality of through holes arranged with a predetermined pitch along a perimeteric direction thereof, and a cutout portion provided in a predetermined position along the perimeteric direction;
   (2) a first and a second sensor elements, each comprising a light-emitting element and a light-receiving element, and disposed within a predetermined angle in a manner to correspond with said through holes in said disc;
   (3) a third sensor element comprising a light-emitting element and a light-receiving element, and disposed in a manner to correspond with said cutout portion in said disc; and
   (4) a control means comprising a signal processing unit for generating an output of detection signal corresponding to an angle and a direction of rotation of said disc using signals provided by said first, second and third sensor elements, and a memory unit for storing, as a positional information, the output provided by said signal processing unit when a main switch is turned on, and wherein said control means includes:
      (a) a first means for introducing a dark current mode for maintaining said sensor elements operative with a lower supply current than a current consumed under a normal operating condition, even when said main switch is in an OFF position;
      (b) a second means for introducing a memory backup mode for maintaining a storing condition of the positional information supplied from said signal processing unit by providing a current supply to said memory unit, even when said main switch is in the OFF position;
      (c) a third means for canceling the memory backup mode and the dark current mode so as to turn said sensor elements and said control means into normal operating conditions thereof, when said sensor elements operated under the dark current mode of said first means detect a motion of said disc; and
      (d) a fourth means for activating said first and second means into operation so as to resume the memory backup mode and the dark current mode, when said sensor elements no longer detect motion of said disc while in a condition after said third means has canceled the memory backup mode and the dark current mode.

2. The rotation angle detector according to claim 1, wherein said first means controls in a manner to turn either one of said first and second sensor elements into the dark current mode, and to turn the other of said first and second sensor elements into an OFF state during the dark current mode introduced thereby.

3. The rotation angle detector according to claim 1, wherein said control means introduces the memory backup mode and an OFF mode, when a predetermined time has elapsed after detection of a door-lock signal or a steering shaft-lock signal.

* * * * *